United States Patent
Williams et al.

(10) Patent No.: US 6,770,593 B1
(45) Date of Patent: Aug. 3, 2004

(54) FERTILIZER

(75) Inventors: Richard Henry Williams, Essex (GB); Peter Harding, Hampshire (GB)

(73) Assignee: Mandops (UK) Limited, Hampshire (GB)

( * ) Notice: Subject to any disclaimer, the term of this patent is extended or adjusted under 35 U.S.C. 154(b) by 0 days.

(21) Appl. No.: 09/889,800

(22) PCT Filed: Feb. 7, 2000

(86) PCT No.: PCT/GB00/00367
§ 371 (c)(1),
(2), (4) Date: Oct. 12, 2001

(87) PCT Pub. No.: WO00/46169
PCT Pub. Date: Aug. 10, 2000

(30) Foreign Application Priority Data

Feb. 5, 1999 (GB) ................................................ 9902665

(51) Int. Cl.⁷ .......................... A01N 33/04; C05G 1/00; C05G 3/04
(52) U.S. Cl. ........................ 504/101; 504/345; 71/27; 71/32; 71/63; 424/601; 424/711; 424/713; 514/563; 514/568
(58) Field of Search ................................ 504/101, 345; 71/27, 32, 63; 424/601, 711, 713; 514/563, 568

(56) References Cited

U.S. PATENT DOCUMENTS

| | | | |
|---|---|---|---|
| 5,047,078 A | 9/1991 | Gill | 71/11 |
| 5,341,932 A * | 8/1994 | Chen et al. | 206/524.7 |
| 5,514,200 A | 5/1996 | Lovatt | 71/11 |
| 5,707,418 A | 1/1998 | Hsu | 71/32 |
| 5,795,847 A | 8/1998 | Nielsen et al. | 504/206 |
| 5,800,837 A * | 9/1998 | Taylor | 424/601 |
| 5,865,870 A | 2/1999 | Hsu | 71/32 |

FOREIGN PATENT DOCUMENTS

| | | |
|---|---|---|
| DE | 133512 | 1/1979 |
| DE | 226 755 A1 | 9/1985 |
| EP | 0 792 583 A1 | 9/1997 |
| EP | 0 878 129 A 1 | 11/1998 |
| GB | 2 259 912 A | 3/1993 |
| JP | 62263106 | 11/1987 |
| JP | 3163001 | 7/1991 |
| JP | 5194129 | 8/1993 |
| JP | 6183903 A | 5/1994 |

OTHER PUBLICATIONS

UK Search Report, Application No. GB 9902665.0, dated Sep. 8, 1999.
Sevenier et al.; "Ethylene Production and Involvement During the First Steps of Durum Wheat (Triticum) Anther Culture"; Physiologia Plantarum, 1996 (AN–PREV 1996 987 50116) Document XP–002133847. Abstract.

* cited by examiner

Primary Examiner—S. Mark Clardy
(74) Attorney, Agent, or Firm—Renner, Otto, Boisselle & Sklar, LLP

(57) ABSTRACT

The present invention provides a liquid fertilizer comprising a mixture of a salt of phosphorous acid together with either a thiosulphate such as ammonium or potassium thiosulphate and/or a salt of salicylic acid or salicyle amide. The use of this combination as a foliar spray, soil drench or irrigation component produces a greater fertilizer effect (on plant vigour and growth) and greater resistance to or control of parasitic fungal diseases, than each of the components applied individually or any combination of just two components.

45 Claims, No Drawings

FERTILIZER

FIELD OF THE INVENTION

The present invention relates to novel compositions having fertilising and anti-fungal effects, to processes for their preparation, and to methods of fertilising plants and controlling fungi using them.

BACKGROUND OF THE INVENTION

Phosphorus is one of the essential major elements required by plants and it is usually supplied to plants in the form of phosphate and/or polyphosphate. Phosphates are the salts of phosphoric acid (having the formula $H_3PO_4$ and molecular weight of 98). In recent years, it has been shown that plants can obtain phosphorus from phosphonates (sometimes also referred to as phosphites) which are the salts (organic or inorganic) of phosphonic acid (also referred to as phosphorous acid) (having the formula $H_3PO_3$ and molecular weight of 82). See, for example, U.S. Pat. Nos. 5,514,200 & 5,830,255 to Lovatt; U.S. Pat. No. 5,707,418 to Hsu; U.S. Pat. No. 5,800,837 to Taylor. These describe formulations containing phosphorous acid or phosphonates suitable as fertilisers for plants. It has also been shown that phosphonate compounds are useful as fungicides, especially where the fungal organisms are phycomycetes or oomycetes. See, for example, U.S. Pat. Nos. 4,075,324 & 4,119,724 to Thizy; U.S. Pat. No. 4,139,616 to Lacroix et al; U.S. Pat. Nos. 4,698,334, 4.806,445 & 5,169,646 to Honriere et al; U.S. Pat. Nos 4,935,410 & 5,070,083 to Bartlet; U.S. Pat. No. 5,736,164 to Taylor. These describe formulations, containing phosphorous acid or phosphonates, suitable as fungicides for plants.

Ammonium thiosulphate and potassium thiosulphate, either alone or mixed with other liquid fertiliser components, have been used for many years as fertilisers. See literature on "Thio-sul"® and KTS® sulphur fertilisers produced by Tessenderlo Kerley. See also UK Patent No. GB 2,259,912 to Sampson, which describes the use of ammonium thiosulphate in a plant growth stimulator.

WPI Abstract Accession No. 91-249421 discloses a cut flower preserving agent comprising a water-soluble silver salt (100 pts. wt.) and thiosulphate (300–2500 pts. wt.) to which a phosphite (30–300 pts. wt.) is added as a stabilising agent.

Some of the problems with the prior art are that the fertilising effect of phosphonate is less than might be expected from the amount of phosphorus applied, and the fungicidal effect is fairly limited in terms of the types of pathogen controlled. This is due to a complex mode of action involving a combination of some fungistatic action and natural plant defences coming into play (See Guest D I & Grant B R (1991)—The Complex action of phosphonates in plants—Biological Reviews 66, 159–187). The use of phosphonate, whilst improving the resistance of plants to infections of downy mildew (eg Plasmopora) and Phytophthora diseases, does tend to increase the risk of ascomycete (eg Erysiphe) infections. The present invention seeks to provide a solution to these problems.

SUMMARY OF THE INVENTION

According to one aspect of the present invention there is provided a fertiliser composition comprising at least one phosphonate and at least one thiosulphate.

According to another aspect of the present invention there is provided a fertiliser composition comprising at least one phosphonate and at least one salicylic acid, homologue, derivative, or salt thereof.

According to yet another aspect of the present invention there is provided a fertiliser composition comprising at least one thiosulphate and at least one salicylic acid, homologue, derivative, or salt thereof.

According to a further aspect of the present invention there is provided a fertiliser composition comprising at least one thiosulphate, at least one phosphonate and at least one salicylic acid, homologue, derivative, or salt thereof.

DETAILED DESCRIPTION

The present invention comprises using a mixture of a phosphonate together with either a thiosulphate, or at least one salicylic acid, homologue, derivative, or salt thereof. The use of this combination shows a synergistic effect, in that the combination of phosphonate with thiosulphate or salicylic acid, homologues, salts or derivatives thereof produces a greater fertiliser effect and fungicidal effect than the individual components used separately. There may be an even greater effect if all three components (ie phosphonate, thiosulphate and salicylic acid, homologue, salt or derivative thereof) were used together. The combination of thiosulphate with a salicylic acid, homologue, salt or derivative thereof, in the absence of phosphonate, also produces a fertiliser effect and fungicidal effect.

Fertilisers based on the present invention provide a greater growth effective response than phosphonates or thiosulphates alone and the degree of fungicidal protection or resistance is broader than that achieved with phosphonates or thiosulphates alone. Plants treated with the present invention suffer less from phycomycete diseases (for example phytophthoras and downy mildews) than those treated with for example phosphonate alone and are also less prone to other parasitic fungi such as powdery mildews. Thus the present invention provides a means for applying a single product to plants which is an effective fungicide as well as an effective fertiliser.

Another advantage of the present invention is that the formulation is very storage stable, for example tests on mixtures of potassium phosphonate and ammonium thiosulphate stored for over one year have shown that there is no oxidation of the phosphonate to phosphate and the stored material shows no signs of cloudiness or precipitation. The use of further organic acids as buffers (as is required in U.S. Pat. Nos. 5,514,200 & 5,830,255) is also not required to achieve stable solutions.

By "phosphonate" we mean a salt of phosphonic acid ($H_3PO_3$). Phosphonates contain the trivalent $\equiv PO_3$ radical. For the avoidance of doubt, phosphoric acid is sometimes referred to as phosphorous acid and its salts as phosphites. Mixtures of phosphonates may be employed.

The phosphonate may be any metal ion or other cation which forms such a salt. As phosphonic acid has a P—H bond it forms a mono and di series of salts. Both mono and di salts and mixtures thereof may be used in the present invention. Preferably the phosphonate is an ammonium phosphonate or alkali phosphonate. Amongst the alkali phosphonates, sodium or potassium phosphonate are preferred. Potassium phosphonate is particularly preferred, in the form of mono- and/or di-potassium phosphonate ($KH_2PO_3$, $K_2HPO_3$ respectively).

Phosphonates may be produced by the neutralisation of phosphonic acid by an alkali. The present invention also encompasses the use of phosphonic acid which is subsequently converted to its phosphonate this conversion may take place in situ or ex situ. When using, for example, potassium hydroxide for the neutralisation, depending on the molar ratio of potassium hydroxide to phosphorous acid, the phosphonate solution will contain varied amounts of di-potassium phosphonate, mono-potassium phosphonate and un-reacted phosphorous acid. We have found that an approximately 42% w/w solution, having a pH of between 6.7 and 7.3 and containing approximately equal amounts of mono- and di-potassium phosphonate is a clear, colourless and very stable starting material for our present invention.

The thiosulphate may be any suitable salt of a metal or other cation. Preferably the thiosulphate is ammonium, sodium or potassium thiosulphate or a mixture thereof. More preferably the thiosulphate is in the form of either ammonium or potassium thiosulphate ($(NH_4)_2S_2O_3$ or $K_2S_{2O3}$).

The most common form of thiosulphate is ammonium thiosulphate, and this is readily available commercially as a 60% w/w solution, with a pH of about 7.5 and a specific gravity of about 1.32. If a higher proportion of potassium is required in the final foliar fertiliser, the ammonium thiosulphate can be substituted, either partly or wholly, with potassium thiosulphate.

The present invention includes functional homologues and derivatives of salicylic acid and its salts. By this we mean that the functional homologue or derivative should be capable of providing a fertiliser effect and/or antifungal effect. Examples of such derivatives of salicylic acid include salicylamide or a salt thereof, and esters.

Examples of homologues of salicylic acid include benzoic acid or a salt or derivative thereof, such as an ester. Examples of benzoic acid compounds which may be used in the present invention may be found in WO99/25191.

The salicylic acid is preferably in the form of its potassium salicylate salt or salicylamide—$C_7H_5KO_3$ or $C_7H_7NO_2$.

Salicylic acid itself has low solubility, but inorganic salts of salicylic acid, such as sodium or potassium salicylate are readily soluble. When salicylamide is used, rather than salicylic acid or a salicylate, the addition of a few drops of alkali assists in its solution, by forming for example sodium or potassium salicylamide. Salicylamide also dissolves more readily in the thiosulphate solution, the presence of small amounts of alkali or ammonia in the thiosulphate solution assisting in the solubilisation.

The preparation of the compounds used in the present invention is well known in the art. The compounds may be prepared in situ or ex situ.

In one embodiment, the composition of the present invention does not include a water-soluble silver salt. In another embodiment, if the composition contains a solution of 100 parts by weight water-soluble silver salt, and 300–2500 parts by weight thiosulphate, then the amount of phosphonate is other than 30 to 300 parts by weight The compositions of the present invention are useful as fertiliser, particularly foliar fertilisers. More particularly the compositions of the present invention increase plant growth compared to the individual components alone, stimulate growth in plants, plant vigour and/or effect crop yield, for example by reducing tuber blight.

The compositions of the present invention also have an antifungal effect. This may be a fungicidal or fungistatic effect. The compositions of the present invention may have activity against parasitic fungi. The compositions may have activity against phycomycete diseases such as phytophthoras and downy mildews, for example, Plasmopora; and/or ascomycetes such as, for example. Erysiphe.

In one particularly preferred embodiment the composition further comprises a plant growth regulator. Preferably the plant growth regulator is chlormequat.

In order to apply the composition to the plant or environs of the plant, the composition may be used as a concentrate or more usually is formulated into a composition which includes an effective amount of the composition of the present invention together with a suitable inert diluent, carrier material and/or surface active agent. Preferably the composition is in the form of an aqueous solution which may be prepared from the concentrate. By effective amount we mean that the composition (and/or its individual components) provides a fertilising and/or antifungal effect. Preferably an effective amount of the components is a concentration of up to about 4M phosphonate, up to about 5M thiosulphate and/or up to about 0.8M salicylate. Thus, in one embodiment the concentrate may comprise up to about 10M of the components. The concentrate formulation may for example be diluted at ratios of concentrate to water of about 1:40 to 1:600, and generally is formulated to have pH of about 6.5 to 8.5. At a 1:40 dilution, a concentrate of about 10M would give rise to an application concentrate of up to about 0.25M.

The rate and timing of application will depend on a number of factors known to those skilled in the art, such as the type of species etc. The composition is generally applied In an amount of from 0.01 to 10 kg per hectare, preferably 0.1 to 6 kg per hectare. Preferably the phosphonate is applied at 150 g/ha to 2 kg/ha. Preferably the thiosulphate is applied at 250 g/ha to 6 kg/ha. Preferably the salicylic acid, a homologue, derivative, or salt thereof is applied at 1 g/ha to 100 g/ha.

In one preferred embodiment, a fertiliser composition according to the present invention comprises about 150 g/l phosphonate, about 275 g/l thiosulphate and/or about 10 g/l salicylamide. Preferably the phosphonate comprises about 75 g/l mono-potassium phosphonate and about 75 g/l di-potassium phosphonate.

As well as varying amounts of each compound to be blended together, as is common with many foliar fertilisers, it is also possible to combine other fertilising elements, such as but not limited to, iron, copper, boron and molybdenum (often known as micronutrients) in the final solution. These may be added as soluble inorganic compounds (eg sodium borate or sodium molybdate) or as chelates (eg copper EDTA) or other metal complexes.

The compositions of the present invention can be applied to the soil, plant, seed, or other area to be protected. Preferably the present invention is applied to the foliage of plants. The composition may be applied in the form of dusting powders, wettable powders, granules (slow or fast release), emulsion or suspension concentrates, liquid solutions, emulsions, seed dressings, or controlled release formulations such as microencapsulated granules or suspensions, soil drench, irrigation component, or preferably a foliar spray.

Dusting powders are formulated by mixing the active ingredient with one or more finely divided solid carriers and/or diluents, for example natural clays, kaolin, pyrophyllite, bentonite, alumina, montmorllonite, kieselguhr, chalk, daiatomaceous earths, calcium phospates, calcium and magnesium carbonates, sulfur, lime, flours, talc and other organic and inorganic solid carriers.

Granules are formed either by absorbing the active ingredient in a porous granular material for example pumice, attapulgite clays, fuller's earth, kieselguhr, diatomaceous earths, ground corn cobs, and the like, or on to hard core materials such as sands, silicates, mineral carbonates, sulfates, phosphates, or the like. Agents which are commonly used to aid in impregnation, binding or coating the solid carriers include aliphatic and aromatic petroleum solvents, alcohols, polyvinyl acetates, polyvinyl alcohols, ethers, ketones, esters, dextrins, sugars and vegetable oils, with the active ingredient. Other additives may also be included, such as emulsifying agents, wetting agents or dispersing agents.

Microencapsulated formulations (microcapsule suspensions CS) or other controlled release formulations may also be used, particularly for slow release over a period of time, and for seed treatment.

Alternatively the compositions may be in the form of liquid preparations to be used as dips, irrigation additives or sprays, which are generally aqueous dispersions or emulsions of the active ingredient in the presence of one or more known wetting agents, dispersing agents or emulsifying agents (surface active agents). The compositions which are to be used in the form of aqueous dispersions or emulsions are generally supplied in the form of an emulsifiable concentrate (EC) or a suspension concentrate (SC) containing a high proportion of the active ingredient or ingredients. An EC is an homogeneous liquid composition, usually containing the active ingredient dissolved in a substantially non-volatile organic solvent. An SC is a fine particle size dispersion of solid active ingredient in water. To apply the concentrates they are diluted in water and are usually applied by means of a spray to the area to be treated.

Suitable liquid solvents for ECs include methyl ketone, methyl isobutyl ketone, cyclohexanone, xylenes, toluene, chlorobenzene, paraffins, kerosene, white oil, alcohols (for example, butanol), methylnaphthalene, trimethylbenzene, trichloroethylene, N-methyl-2-pyrrolidone and tetrahydrofurfuryl alcohol (THFA).

These concentrates are often required to withstand storage for prolonged periods and after such storage, to be capable of dilution with water to form aqueous preparations which remain homogeneous for a sufficient time to enable them to be applied by conventional spray equipment. The concentrates may contain 1–85% by weight of the active ingredient or ingredients. When diluted to form aqueous preparations such preparations may contain varying amounts of the active ingredient depending upon the purpose for which they are to be used.

The composition may also be formulated as powders (dry seed treatment DS or water dispersible powder WS) or liquids (flowable concentrate FS, liquid seed treatment LS), or microcapsule suspensions CS for use in seed treatments. The formulations can be applied to the seed by standard techniques and through conventional seed treaters. In use the compositions are applied to the plants, to the locus of the plants, by any of the known means of applying fertiliser compositions, for example, by dusting, spraying, or incorporation of granules.

When the final solution is to be applied to plants which, because of their hairy or waxy surface, may be difficult to wet, it may also be advantageous to include other additives, commonly known in the agrochemical industry, such as surfactants, wetting agents, spreaders and stickers. (Examples of wetting agents include silicone surfactants, nonionic surfactants such as alkyl ethoxylates, anionic surfactants such as phosphate ester salts and amphoteric or cationic surfactants such as fatty acid amido alkyl betaines).

As indicated above, the compounds of the invention may be the sole active ingredient of the composition or they may be admixed with one or more additional active ingredients such as nematicides, insecticides synergists, herbicides, additional fungicides, additional fertilisers or plant growth regulators where appropriate.

As indicated above, the fertilisers produced according to this present invention are usually applied to the foliage of plants but may also be applied to the soil or added to the irrigation water. The fertilisers may be used advantageously on many types of agricultural and horticultural crops, including but not limited to, cereals, legumes, brassicas, cucurbits, root vegetables, sugar beet, grapes, citrus & other fruit trees and soft fruits. More particularly, crops that will benefit from the fertiliser include, but are not limited to, peas, oil seed rape, carrots, spring barley, avocado, citrus, mango, coffee, deciduous tree crops, grapes, strawberries and other berry crops, soybean, broad beans and other commercial beans, corn, tomato, cucurbitis and other cucumis species, lettuce, potato, sugar beets, peppers, sugar cane, hops, tobacco, pineapple, coconut palm and other commercial and ornamental palms, rubber and other ornamental plants.

Various further preferred features and embodiments of the invention will now be described by reference to the following non-limited Examples.

EXAMPLE 1

Solution 1

An aqueous solution containing a total of 30% by weight of mono and di-potassium phosphonate in roughly equal proportions.

Solution 2

An aqueous solution containing 55% by weight of ammonium thiosulphate ("ATS").

Solution 3

An aqueous solution containing 20 grams per litre of potassium salicylamide.

Solution 4

An aqueous solution containing 75 g/L mono potassium phosphonate, 75 g/L di-potassium phosphonate, 275 g/L ammonium thiosulphate and 10 g/L potassium salicylamide.

These solutions were applied to lettuce plants, both alone and in combination, and the applications were repeated after a 10 day interval. There were five replicates of each treatment and the results are presented as means of the five replicates. Five plants were also left unsprayed as an untreated control to the other treatments. After eight, twelve, sixteen and twenty-one days, the plants were examined for disease.

TABLE 1

Powdery Mildew Score (0–9, where higher number equals greater degree of disease)

| Treatment (Applied initially and repeated 10 days later) | Days after first spray | | |
|---|---|---|---|
| | 8 days | 12 days | 16 days |
| Untreated | 4.0 | 6.6 | 7.2 |
| Solution 1 (1L/ha) | 0.8 | 2.2 | 3.6 |

TABLE 1-continued

Powdery Mildew Score (0–9, where higher number equals greater degree of disease)

| Treatment (Applied initially and repeated 10 days later) | Days after first spray | | |
|---|---|---|---|
| | 8 days | 12 days | 16 days |
| Solution 2 (1L/ha) | 1.0 | 1.2 | 2.4 |
| Solution 3 (1L/ha) | 1.6 | 3.2 | 4.2 |
| Solution 1 (1L/ha) + Solution 2 (1L/ha) | 0.0 | 0.4 | 1.0 |
| Solution 1 (1L/ha) + Solution 3 (1L/ha) | 0.4 | 0.6 | 1.0 |
| Solution 1 (1L/ha) + Solution 2 (1L/ha) + Solution 3 (1L/ha) | 0.8 | 0.6 | 0.6 |

Table 1 shows the synergistic effect on disease levels achieved by adding Solutions 1 & 2 (phosphonate+ATS) and between Solutions 1 & 3 (phosphonate+salicylamide) and the further effect of using all three solutions together. Disease levels were reduced from a mean of 7.2 to a mean of 0.6.

As well as assessing disease levels, the growth of the plants was assessed by measuring the mean plant diameters after 35 days growth and by measuring the mean above ground fresh and dry weights.

TABLE 2

Plant Growth after treatment with the example solutions

| Treatment (Applied initially and repeated 10 days later) | Amount of Rooting (0–9, 0 = least rooting) - mean | Plant Diameter (mm) - mean | Above-Ground Fresh Weight (g) - mean | Above-Ground Dry Weight (g) - mean |
|---|---|---|---|---|
| Untreated | 5.3 | 124 | 102.3 | 8.3 |
| Solution 1 (1L/ha) | 6.0 | 148 | 116.3 | 9.3 |
| Solution 2 (1L/ha | 5.3 | 160 | 109.0 | 8.7 |
| Solution 3 (1L/ha) | 4.7 | 150 | 104.7 | 8.5 |
| Solution 1 (1L/ha) + Solution 2 (1L/ha) | 6.7 | 144 | 119.0 | 9.5 |
| Solution 1 (1L/ha) + Solution 3 (1L/ha) | 6.7 | 170 | 120.7 | 9.7 |
| Solution 1 (1L/ha) + Solution 2 (1L/ha) + Solution 3 (1L/ha) | 6.7 | 168 | 131.7 | 10.6 |

Table 2 shows the synergistic effect on plant growth caused by adding Solutions 1 & 2 (phosphonate+ATS), Solutions 1 & 3 (phosphonate+salicylamide) and the further effect of using all three solutions together.

The abbreviations used in the following Examples A–E are:

A=phosphonate+thiosulphate
B=phosphonate+salicylate/salicylamide
C=thiosulphate+salicylate/salicylamide
D=thiosulphate+salicylate/salicylamide+phosphate
E=thiosulphate+salicylate+chlormequat
KP40=40% potassium phosphonate
KT47=47% potassium thiosulphate (w/v)
KS20=20% potassium salicylate (w/v)
CS8=salicylamide (20g/l)
AT60=60% ammonium thiosulphate
PF723=55% ammonium thiosulphate

EXAMPLES A

Solution 1=KP40 at 0.75 l/ha every 10 days
Solution 2=PF723 at 1.0 l/ha every 10 days

TABLE A1

Percent Powdery Mildew - Lettuce

| Treatment (Applied initially and repeated after a 10 day interval) | Days After First Spray | | |
|---|---|---|---|
| | 8 Days | 12 Days | 16 Days |
| Untreated | 40 | 66 | 72 |
| Solution 1 (1L/Ha) | 8 | 22 | 36 |
| Solution 2 (1L/Ha) | 10 | 12 | 24 |
| Solution 1 (1L/Ha) + Solution 2 (1L/Ha) | 0 | 4 | 10 |

TABLE A2

Percent Powdery Mildew and Fertiliser Attributes - Sugar Beet

| Treatment (Applied initially and repeated after a 10 day interval) | Days After First Spray | | Above Ground Fresh Weight |
|---|---|---|---|
| | +28 Days (x 1 Rate) | +35 Days (x 1 Rate) | (g) - Mean (x 1 Rate) |
| Untreated | 22 | 31 | 144.7 |
| Solution 1 | 6 | 4 | 152.3 |
| Solution 2 | 2 | 2 | 153.3 |
| Solution 1 + Solution 2 | 0 | 0 | 154.3 |

TABLE A3

Fertiliser Attributes - Spring Barley

| Treatment (Applied initially and repeated after a 10 day interval) | Plant Health 'Greenness' Score (0–9) +35 Days (x 1 Rate) | Above Ground Fresh Weight (g) - Mean (x 1 Rate) | Above Ground Dry Weight (g) - Mean (x 1 Rate) | Amount of Above Ground tissue (0–9) at Harvest (x 1 Rate) |
|---|---|---|---|---|
| Untreated | 5.6 | 68.8 | 7.7 | 5.0 |
| Solution 1 | 5.6 | 67.0 | 7.4 | 5.3 |
| Solution 2 | 5.4 | 68.3 | 7.2 | 5.3 |
| Solution 1 + Solution 2 | 6.6 | 72.7 | 7.9 | 6.0 |

TABLE A4

GRAPE TRIAL
Percent Powdery Mildew

| Treatment (applied initially and repeated at 10 day intervals) | Days After First Spray | | | | | |
|---|---|---|---|---|---|---|
| | +16 Days | +20 Days | +24 Days | +28 Days | +32 Days | +36 Days |
| Untreated | 7.3 | 9.3 | 11.3 | 14.0 | 14.0 | 14.7 |
| KP40 @ 0.75 l/ha | 5.3 | 6.7 | 8.0 | 11.3 | 10.7 | 10.7 |
| PF723 @ 1.0 l/ha | 2.7 | 7.3 | 7.3 | 8.0 | 6.7 | 6.7 |
| KP40 @ 0.75 l/ha + PF723 @ 1.0 l/ha | 1.3 | 5.3 | 6.0 | 6.0 | 5.3 | 5.3 |

TABLE A5

LETTUCE TRIAL
Percent Powdery Mildew

| Treatment (Applied initially and repeated at 10 day intervals) | +16 Days | +20 Days | +24 Days |
|---|---|---|---|
| Untreated | 10.0 | 16.7 | 24.7 |
| KP40 @ 0.75 l/ha | 7.3 | 12.0 | 18.0 |
| PF723 @ 1.0 l/ha | 8.0 | 12.0 | 15.3 |
| KP40 @ 0.75 l/ha + PF23 @ 1.0 l/ha | 5.3 | 8.7 | 14.0 |

TABLE A6

Broad Bean - Fertiliser Attributes
(KP40 = 40% Potassium Phosphite;
PF723 = 55% Ammonium Thiosulphate)

| Treatment (2 Applications in total every 15 days) | Above Ground Fresh Weight (g) - Mean | Above Ground Dry Weight (g) - Mean |
|---|---|---|
| Untreated | 143.8 | 14.6 |
| KP40 (5.0 l/ha) + PF723 (0.5 l/ha) | 150.7 | 15.5 |
| KP40 (3.0 l/ha) + PF723 (0.5 l/ha) | 160.3 | 16.1 |
| KP40 (5.0 l/ha) + PF723 (1.0 l/ha) | 168.0 | 17.3 |
| KP40 (3.0 l/ha) + PF723 (1.0 l/ha) | 161.3 | 16.8 |

TABLE A7

Sugar Beet
Percent Powdery Mildew and Fertiliser Attributes
(KP40 = 40% Potassium Phosphite;
AT60 = 60% Ammonium Thiosulphate)

| Treatment (2 Applications in total - every 15 days) | Days After First Spray +24 Days | Days After First Spray +28 Days | Root Fresh Weight (g) - Mean | Root Dry Weight (g) - Mean | Above Ground Fresh Weight (g) - Mean | Above Ground Dry Weight (g) - Mean |
|---|---|---|---|---|---|---|
| Untreated | 14 | 24 | 83.0 | 12.2 | 137.8 | 15.3 |
| KP40 (0.375 l/ha) + AT60 (10.0 l/ha) | 0 | 4 | 90.3 | 12.9 | 142.3 | 15.3 |
| KP40 (0.75 l/ha) + AT60 (10.0 l/ha) | 0 | 2 | 91.7 | 13.9 | 145.0 | 16.4 |
| KP40 (0.375 l/ha) + AT60 (6.0 l/ha) | 0 | 0 | 82.7 | 12.4 | 144.0 | 16.5 |
| KP40 (0.75 l/ha) + AT60 (6.0 l/ha) | 0 | 0 | 97.7 | 13.6 | 145.3 | 15.5 |
| KP40 (3.75 l/ha) + AT60 (10.0 l/ha) | 0 | 6 | 89.7 | 13.2 | 144.0 | 15.8 |
| KP40 (2.5 l/ha) + AT60 (10.0 l/ha) | 2 | 8 | 89.7 | 14.0 | 143.3 | 15.4 |
| KP40 (2.5 l/ha) + AT60 (6.0 l/ha) | 0 | 4 | 98.0 | 13.9 | 146.7 | 16.1 |

TABLE A8

Sugar Beet
Percent Powdery Mildew and Fertiliser Attributes
(KP40 = 40% Potassium Phosphite;
AT60 = 60% Ammonium Thiosulphate)

| Treatment (2 Applications in total - every 15 days) | Days After First Spray +24 Days | Days After First Spray +28 Days | Root Fresh Weight (g) - Mean | Root Dry Weight (g) - Mean | Above Ground Fresh Weight (g) - Mean | Above Ground Dry Weight (g) - Mean |
|---|---|---|---|---|---|---|
| Untreated | 22 | 28 | 109.7 | 13.3 | 144.7 | 14.7 |
| KP40 (0.375 l/ha) + AT60 (10.0 l/ha) | 0 | 2 | 110.3 | 13.2 | 149.7 | 15.5 |
| KP40 (0.75 l/ha) + AT60 (10.0 l/ha) | 0 | 2 | 118.7 | 13.8 | 147.7 | 15.1 |
| KP40 (0.375 l/ha) + AT60 (6.0 l/ha) | 0 | 6 | 117.7 | 13.6 | 151.3 | 15.0 |
| KP40 (0.75 l/ha) + AT60 (6.0 l/ha) | 2 | 2 | 113.7 | 13.7 | 150.7 | 15.2 |
| KP40 (3.75 l/ha) + AT60 (10.0 l/ha) | 0 | 0 | 119.0 | 14.2 | 150.7 | 15.0 |
| KP40 (2.5 l/ha) + AT60 (10.0 l/ha) | 2 | 0 | 117.3 | 14.7 | 148.7 | 15.0 |
| KP40 (2.5 l/ha) + AT60 (6.0 l/ha) | 2 | 2 | 119.7 | 14.0 | 154.3 | 15.6 |

TABLE B1

Fertiliser Attributes Strawberry

| Treatment (Applied initially and repeated after a 10 day interval) | Plant Health 'Greenness' Score (0–9) +28 Days (× 1 Rate) | Above Ground Fresh Weight (g) - Mean (× 1 Rate) | Above Ground Dry Weight (g) - Mean (× 1 Rate) |
|---|---|---|---|
| Untreated | 4.8 | 50.8 | 5.0 |
| Solution 1 | 5.6 | 53.7 | 5.1 |
| Solution 3 | 6.0 | 56.0 | 5.6 |
| Solution 1 + Solution 3 | 6.4 | 63.0 | 6.2 |

TABLE B2

Fertiliser Attributes - Spring Barley

| Treatment (Applied initially and repeated after a 10 day interval) | Above Ground Fresh Weight (g) - Mean (× 1 Rate) | Above Ground Dry Weight (g) - Mean (× 1 Rate) | Amount of Above Ground tissue (0–9) (× 1 Rate) |
|---|---|---|---|
| Untreated | 77.3 | 8.6 | 5.0 |
| Solution 1 | 78.3 | 8.7 | 5.3 |
| Solution 3 | 75.0 | 8.4 | 5.3 |
| Solution 1 + Solution 3 | 81.7 | 9.7 | 5.7 |

TABLE B3

Percent Powdery Mildew - Sugar Beet

| Treatment (Applied initially and repeated after a 10 day interval) | +28 Days (× 1 Rate) | +32 Days (× 1 Rate) |
|---|---|---|
| Untreated | 23 | 35 |
| Solution 1 | 6 | 18 |
| Solution 3 | 12 | 20 |
| Solution 1 + Solution 3 | 0 | 12 |

TABLE B4

Fertiliser Attributes - Spring Barley

| Treatment (Applied initially and repeated after a 10 day interval) | Amount of Rooting (0–9) (× 1 Rate) | Amount of Above Ground Tissue (0–9) (× 1 Rate) |
|---|---|---|
| Untreated | 5.2 | 5.0 |
| Solution 1 | 5.3 | 5.7 |
| Solution 3 | 6.0 | 5.7 |
| Solution 1 + Solution 3 | 6.3 | 6.0 |

TABLE B5

Percent Powdery Mildew - Grape

| Treatment (Applied Initially and repeated at 10 day intervals) | +16 Days | +20 Days | +24 Days | +28 Days | +32 Days | +36 Days |
|---|---|---|---|---|---|---|
| Untreated | 7.3 | 9.3 | 11.3 | 14.0 | 14.0 | 14.7 |
| KP40 @ 0.75 l/ha | 5.3 | 6.7 | 8.0 | 11.3 | 10.7 | 10.7 |
| KS20 @ 1.0 l/ha | 5.3 | 6.7 | 8.0 | 11.3 | 9.3 | 11.3 |
| KP40 @ 0.75 l/ha + KS20 @ 1.0 l/ha | 1.3 | 2.7 | 4.0 | 5.3 | 4.7 | 4.7 |

TABLE B6

% Tuber Blight and Yield Attributes - Potato

| Treatment (Applied initially and repeated at 10 day intervals) | Percent Tuber Blight (%) | Final Tuber Yield (g) | Final Tuber 'Quality' (Premium Potatoes) (0–9) | Mean Final 'First Grade' Tuber Yield (g) | Relative Final 'First Grade' Tuber Yield (%) |
|---|---|---|---|---|---|
| Untreated | 6.0 | 241.7 | 4.73 | 114.3 | 100 |
| KP40 @ 0.75 l/ha | 2.7 | 259.8 | 4.67 | 121.3 | 106 |
| KS20 @ 1.0 l/ha | 3.3 | 255.6 | 5.07 | 129.6 | 113 |
| KP40 @ 0.75 l/ha + KS20 @ 1.0 l/ha | 0.7 | 267.4 | 5.67 | 151.6 | 133 |

TABLE B7

Percent Foliar Blight - Potato

| Treatment (Applied Initially & repeated at 10 day intervals) | +16 Days | +20 Days | +24 Days | +28 Days | +32 Days | +36 Days |
|---|---|---|---|---|---|---|
| Untreated | 5.3 | 8.7 | 12.7 | 12.7 | 18.7 | 28.0 |
| KP40 @ 0.75 l/ha | 2.7 | 3.3 | 6.7 | 8.7 | 9.3 | 13.3 |

TABLE B7-continued

Percent Foliar Blight - Potato

| Treatment (Applied Initially & repeated at 10 day intervals) | +16 Days | +20 Days | +24 Days | +28 Days | +32 Days | +36 Days |
|---|---|---|---|---|---|---|
| KS20 @ 1.0 l/ha | 2.0 | 4.0 | 5.3 | 8.0 | 10.0 | 11.3 |
| KP40 @ 0.75 l/ha | 0.7 | 1.3 | 1.3 | 2.0 | 2.7 | 4.7 |
| KS20 @ 1.0 l/ha | | | | | | |

TABLE C1

Percent Powdery Mildew - Grape

| Treatment (Applied Initially and repeated at 10 day intervals) | +16 Days | +20 Days | +24 Days | +28 Days | +32 Days | +36 Days |
|---|---|---|---|---|---|---|
| Untreated | 7.3 | 9.3 | 11.3 | 14.0 | 14.0 | 14.7 |
| KT47 @ 1.5 l/ha | 4.7 | 6.7 | 8.0 | 9.3 | 9.3 | 9.3 |
| KS20 @ 1.0 l/ha | 5.3 | 6.7 | 8.0 | 11.3 | 9.3 | 11.3 |
| KT47 @ 1.5 l/ha + KS20 @ 1.0 l/ha | 2.7 | 5.3 | 6.7 | 8.7 | 7.3 | 6.7 |

TABLE C2

Fertiliser Attributes - Broad Bean

| Treatment (Applied Initially and repeated after a 10 day interval) | Amount of Rooting (0–9) (× 1 Rate) | Above Ground Fresh Weight (g) - Mean (× 1 Rate) | Above Ground Dry Weight (g) - Mean (× 1 Rate) |
|---|---|---|---|
| Untreated | 5.3 | 143.8 | 14.6 |
| Solution 2 | 5.3 | 155.7 | 16.1 |
| Solution 3 | 5.3 | 155.0 | 15.7 |
| Solution 2 + Solution 3 | 5.7 | 163.3 | 16.6 |

TABLE C3

Fertiliser Attributes - Peas

| Treatment (Applied initially and repeated after a 10 day interval) | Plant Health 'Greenness' Score (0–9) +28 Days (× 1 Rate) | Root Fresh Weight (g) - Mean (× 1 Rate) | Root Dry Weight (g) - Mean (× 1 Rate) | Amount of Above Ground Tissue (0–9) at Harvest (× 1 Rate) |
|---|---|---|---|---|
| Untreated | 6.1 | 124.2 | 14.1 | 5.5 |
| Solution 2 | 6.2 | 126.3 | 15.1 | 5.3 |
| Solution 3 | 6.2 | 125.7 | 15.1 | 5.7 |
| Solution 2 + Solution 3 | 6.4 | 130.7 | 15.6 | 6.0 |

TABLE C4

Fertiliser Attributes - Carrot

| Treatment (Applied initially and repeated after a 10 day interval) | Root Dry Weight (g) - Mean (x 1 Rate) | Amount of Rooting (0–9) (x 1 Rate) | Amount of Above Ground Tissue (0–9) at Harvest (x 1 Rate) |
|---|---|---|---|
| Untreated | 5.5 | 5.2 | 5.0 |
| Solution 2 | 6.1 | 5.3 | 5.0 |
| Solution 3 | 6.2 | 5.0 | 5.0 |
| Solution 2 + Solution 3 | 6.4 | 5.7 | 5.7 |

TABLE C5

Percent Powdery Mildew - Oilseed Rape

| Treatment (Applied initially and repeated after a 10 day interval) | Days After First Spray +35 Days (x 1 Rate) |
|---|---|
| Untreated | 14 |
| Solution 2 | 14 |
| Solution 3 | 14 |
| Solution 2 + Solution 3 | 8 |

TABLE C6

Fertiliser Attributes - Sugar Beet

| Treatment (Applied initially and repeated after a 10 day interval) | Root Fresh Weight (g) - Mean (x 1 Rate) | Root Dry Weight (g) - Mean (x 1 Rate) |
|---|---|---|
| Untreated | 109.7 | 13.3 |
| Solution 2 | 111.7 | 13.3 |
| Solution 3 | 113.7 | 13.4 |
| Solution 2 + Solution 3 | 114.7 | 14.1 |

TABLE C7

Fertiliser Attributes - Strawberry

| Treatment (Applied initially and repeated after a 10 day interval) | Plant Health 'Greenness' Score (0–9) +35 Days (x 1 Rate) | Amount of Rooting (0–9) (x 1 Rate) |
|---|---|---|
| Untreated | 5.0 | 5.2 |
| Solution 2 | 6.0 | 5.7 |
| Solution 3 | 6.6 | 5.3 |
| Solution 2 + Solution 3 | 7.0 | 6.0 |

TABLE D1

% Tuber Blight, Final Yield and Quality

| Treatment (Applied initially and repeated at 10 day intervals | Percent Tuber Blight (%) | Final Tuber Yield (g) | Relative Final Tuber Yield (%) | Final Tuber 'Quality' (Premium Potatoes) (0–9) | Mean Final 'First Grade' Tuber Yield (g) | Relative Final 'First Grade' Tuber Yield (%) |
|---|---|---|---|---|---|---|
| Untreated | 6.0 | 241.7 | 100 | 4.73 | 114.3 | 100 |
| KP40 @ 0.75 l/ha | 2.7 | 259.8 | 107 | 4.67 | 121.3 | 106 |
| KT47 @ 1.5 l/ha | 2.7 | 261.7 | 108 | 5.27 | 137.9 | 121 |
| KS20 @ 1.0 l/ha | 3.3 | 255.6 | 106 | 5.07 | 129.6 | 113 |
| KP40 @ 0.75 l/ha + KT47 @ 1.5 l/ha | 0.7 | 271.4 | 112 | 5.60 | 152.0 | 133 |
| KP40 @ 0.75 l/ha + KS20 @ 1.0 l/ha | 0.7 | 267.4 | 111 | 5.87 | 151.6 | 133 |
| KT47 @ 1.5 l/ha + KP40 @ 1.0 l/ha | 0.7 | 272.2 | 113 | 5.60 | 152.4 | 133 |
| KS20 @ 0.75 l/ha + KT47 @ 1.5 l/ha + KS20 @ 1.0 l/ha | 0.7 | 277.0 | 115 | 5.80 | 160.7 | 141 |

TABLE D2

% Tuber Blight, Yield and Quality Benefits

| Treatment (Applied initially) and repeated at 10 day intervals | Percent Tuber Blight (%) | Final Tuber Yield (g) | 'Quality' (Premium Potatoes) (0–9) | Mean Final 'First Grade' Tuber Yield (g) | Relative Final 'First Grade' Tuber Yield (%) |
|---|---|---|---|---|---|
| Untreated | 14.0 | 256.1 | 5.80 | 148.5 | 100 |
| KP40 @ 0.75 l/ha | 10.0 | 271.4 | 5.73 | 155.5 | 105 |
| KT47 @ 1.5 l/ha | 9.3 | 279.2 | 5.80 | 161.9 | 109 |

TABLE D2-continued

% Tuber Blight, Yield and Quality Benefits

| Treatment (Applied initially) and repeated at 10 day intervals | Percent Tuber Blight (%) | Final Tuber Yield (g) | 'Quality' (Premium Potatoes) (0–9) | Mean Final 'First Grade' Tuber Yield (g) | Relative Final 'First Grade' Tuber Yield (%) |
|---|---|---|---|---|---|
| KS20 @ 1.0 l/ha | 9.3 | 292.0 | 5.73 | 167.3 | 113 |
| KP40 @ 0.75 l/ha + KT41 @ 1.5 l/ha | 4.0 | 280.4 | 5.80 | 162.6 | 109 |
| KP40 @ 0.75 l/ha + KS20 @ 1.0 l/ha | 4.7 | 286.3 | 5.80 | 166.1 | 112 |
| KT47 @ 1.5 l/ha + KS20 @ 1.0 l/ha | 3.3 | 290.0 | 5.87 | 170.2 | 115 |
| KP40 @ 0.75 l/ha + KT47 @ 1.5 l/ha + KS20 @ 1.0 l/ha | 1.3 | 278.0 | 6.07 | 168.7 | 114 |

TABLE D3

Spring Barley 1999
Percent Powdery Mildew and Fertiliser Attributes

| Treatment (2 Applications in total - every 15 Days | Days After First Spray +20 Days | Plant Health "Greenness" Score (0–9) +28 Days | Plant Health "Greenness" Score (0–9) +35 Days | Amount of Rooting (0–9) –Mean | Above Ground Fresh Weight (g) –Mean | Above Ground Dry Weight (g) –Mean | Amount of Above Ground Tissue (0–9) –Mean |
|---|---|---|---|---|---|---|---|
| Untreated | 7 | 5.4 | 5.6 | 5.3 | 68.8 | 7.7 | 5.0 |
| KP40 (0.375 l/ha) + CS100 (1.0 l/ha) | 2 | 5.8 | 6.0 | 6.0 | 72.7 | 8.4 | 5.3 |
| KP40 (0.75 l/ha) + CS100 (1.0 l/ha) | 2 | 6.0 | 6.2 | 5.3 | 72.0 | 8.2 | 5.0 |
| KP40 (0.375 l/ha) + CS100 (0.5 l/ha) | 2 | 5.8 | 5.4 | 6.0 | 75.3 | 8.5 | 5.7 |
| KP40 (0.75 l/ha) + CS100 (0.5 l/ha) | 4 | 5.6 | 5.8 | 6.3 | 68.7 | 7.5 | 5.3 |
| KP40 (0.375 l/ha) + CS100 (1.0 l/ha) + AT60 (10.0 l/ha) | 2 | 5.4 | 6.0 | 6.7 | 69.7 | 8.0 | 8.0 |
| KP40 (0.375 l/ha) + CS100 (0.5 l/ha) + AT60 (10.0 l/ha) | 2 | 5.6 | 6.2 | 6.0 | 68.7 | 7.9 | 5.7 |
| KP40 (0.375 l/ha) + CS100 (0.5 l/ha) + AT60 (6.0 l/ha) | 4 | 5.8 | 5.6 | 6.0 | 62.0 | 7.4 | 5.0 |
| KP40 (0.375 l/ha) + CS8 (0.05 l/ha) + AT60 (10.0 l/ha) | 0 | 5.2 | 5.4 | 6.0 | 69.0 | 7.8 | 5.3 |
| KP40 (0.375 l/ha) + CS8 (0.05 l/ha) + AT60 (6.0 l/ha) | 2 | 6.0 | 5.6 | 6.7 | 67.7 | 7.5 | 5.0 |
| KP40 (0.375 l/ha) + CS8 (0.25 l/ha) + AT60 (10.0 l/ha) | 0 | 5.4 | 5.0 | 5.7 | 69.7 | 7.4 | 5.0 |
| KP40 (0.375 l/ha) + CS8 (0.25 l/ha) + AT60 (6.0 l/ha) | 0 | 6.0 | 5.3 | 6.0 | 69.3 | 7.5 | 5.0 |

(KP40 = 40% Potassium Phosphite; CS100 = 10 g/liter Salicylamide; CS8 = 20 g/l Salicylamide; AT60 = 60% Ammonium Thiosulphate)

TABLE D4

Spring Barley
Percent Powdery Mildew and Fertiliser Attributes

| Treatment (2 Applications in total - every 15 Days | Amount of Rooting (0–9) –Mean | Above Ground Fresh Weight (g) –Mean | Above Ground Dry Weight (g) –Mean | Amount of Above Ground Tissue (0–9) –Mean |
|---|---|---|---|---|
| Untreated | 5.2 | 73.0 | 9.1 | 5.0 |
| KP40 (0.375 l/ha) + CS100 (1.0 l/ha) | 6.0 | 83.0 | 9.3 | 5.3 |
| KP40 (0.75 l/ha) + | 5.7 | 82.0 | 9.7 | 5.3 |

TABLE D4-continued

Spring Barley
Percent Powdery Mildew and Fertiliser Attributes

| Treatment (2 Applications in total - every 15 Days) | Amount of Rooting (0–9) –Mean | Above Ground Fresh Weight (g) –Mean | Above Ground Dry Weight (g) –Mean | Amount of Above Ground Tissue (0–9) –Mean |
|---|---|---|---|---|
| CS100 (1.0 l/ha) KP40 (0.375 l/ha) + CS100 (0.5 l/ha) | 5.0 | 77.7 | 8.6 | 6.0 |
| KP40 (0.75 l/ha) + CS100 (0.5 l/ha) | 6.0 | 76.7 | 8.7 | 5.0 |
| KP40 (0.375 l/ha) + CS100 (1.0 l/ha) + AT60 (10.0 l/ha) | 6.0 | 67.3 | 7.8 | 5.0 |
| KP40 (0.375 l/ha) + CS100 (0.5 l/ha) + AT60 (10.0 l/ha) | 6.0 | 68.3 | 8.1 | 5.0 |
| KP40 (0.375 l/ha) + CS100 (0.5 l/ha) + AT60 (6.0 l/ha) | 6.0 | 78.3 | 9.1 | 5.7 |
| KP40 (0.375 l/ha) + CS8 (0.05 l/ha) + AT60 (10.0 l/ha) | 5.7 | 76.0 | 8.8 | 5.7 |
| KP40 (0.375 l/ha) + CS8 (0.05 l/ha) + AT60 (6.0 l/ha) | 6.0 | 78.3 | 9.0 | 5.7 |
| KP40 (0.375 l/ha) + CS8 (0.25 l/ha) + AT60 (10.0 l/ha) | 5.0 | 71.7 | 8.5 | 5.3 |
| KP40 (0.375 l/ha) + CS8 (0.25 l/ha) + AT60 (6.0 l/ha) | 5.7 | 72.0 | 8.1 | 5.0 |

(KP40 = 40% Potassium Phosphite; CS100 = 10 g/liter Salicylamide; CS8 = 20 g/l Salicylamide; AT60 = 60% Ammonium Thiosulphate)

TABLE D5

LETTUCE TRIAL
Fresh Weight Yield and Quality Benefits

| Treatment (Applied initially and repeated at 10 day intervals) | Final Fresh Weight Yield (g) | Quality of Final Fresh Weight Yield (0–9) | Final Fresh Weight "Quality" Yield (g) | Relative Fresh Weight "Quality" Yield (%) | Median Final Fresh Weight Yield (g) | Median Quality of Final Fresh Weight Yield (0–9) | Median Final Fresh Weight "Quality" Yield (g) | Relative Median Fresh Weight Quality" Yield (%) |
|---|---|---|---|---|---|---|---|---|
| Untreated | 81.3 | 5.33 | 43.4 | 100 | 80.6 | 5.27 | 42.5 | 100 |
| KP40 @ 0.75 l/ha | 85.0 | 5.40 | 45.7 | 105 | 87.2 | 5.36 | 46.7 | 110 |
| PF723 @ 1.0 l/ha | 87.7 | 5.40 | 47.4 | 109 | 86.6 | 5.46 | 47.3 | 111 |
| KS20 @ 1.0 l/ha | 83.6 | 5.67 | 47.4 | 109 | 82.6 | 5.64 | 46.6 | 110 |
| KP40 @ 0.75 l/ha + PF723 @ 1.0 l/ha | 89.8 | 5.63 | 50.6 | 117 | 89.8 | 5.64 | 50.8 | 119 |
| KP40 @ 0.75 l/ha + KS20 @ 1.0 l/ha | 90.9 | 5.53 | 50.3 | 116 | 90.6 | 5.64 | 51.1 | 120 |
| PF723 @ 1.0 l/ha + KS20 @ 1.0 l/ha | 86.5 | 5.67 | 49.0 | 113 | 65.4 | 5.64 | 48.2 | 113 |
| KP40 @ 0.75 l/ha + PF723 @ 1.0 l/ha + KS20 @ 1.0 l/ha | 87.9 | 5.67 | 49.8 | 115 | 88.4 | 5.64 | 49.9 | 117 |

(KP40 = 40% Potassium Phosphite; PF723 = 55% Ammonium Thiosulphate; KS20 = 20 gms/liter Potassium Salicylate)

TABLE E1

Benefits of Ammonium Thiosulphate (ATS) and Potassium Salicylate (KS) with Chlormequat (CCC) on Spring Barley

| Treatment (Treatments applied at 3 leaves stage) | Powdery Mildew (%) at +15 days | Amount of Rooting (0–9) Mean of 10 plants | Above Ground Fresh Weight (g) Total of 10 plants | Above Ground Dry Weight (g) Total of 10 plants |
|---|---|---|---|---|
| Untreated | 25 | 5.8 | 30.5 | 3.4 |
| CCC (1.25 l/ha) | 15 | 5.5 | 34.0 | 3.7 |

TABLE E1-continued

Benefits of Ammonium Thiosulphate (ATS) and Potassium Salicylate (KS) with Chlormequat (CCC) on Spring Barley

| Treatment (Treatments applied at 3 leaves stage) | Powdery Mildew (%) at +15 days | Amount of Rooting (0–9) Mean of 10 plants | Above Ground Fresh Weight (g) Total of 10 plants | Above Ground Dry Weight (g) Total of 10 plants |
|---|---|---|---|---|
| CCC (1.25 l/ha) + ATS (1.25 l/ha) | 13 | 6.0 | 31.5 | 3.6 |
| CCC (1.25 l/ha) + KS (20 g/ha) | 18 | 6.0 | 31.3 | 3.5 |
| CCC (1.25 l/ha) + ATS (1.25 l/ha) + KS (20 g/ha) | 8 | 6.5 | 36.0 | 4.0 |

TABLE E2

Benefits of Ammonium Thiosulphate (ATS) and Potassium Salicylate (KS) with Chlormequat (CCC) on Spring Barley

| Treatment (Treatments applied at 3 leaves stage (T1) and prior to start of stem extension (T2)) | Powdery Mildew (%) at +12 days | Powdery Mildew (%) at +15 days | Powdery Mildew (%) at +18 days | Number of Tillers Initiated per Plant (mean of 10 plants) |
|---|---|---|---|---|
| Untreated | 20 | 25 | 38 | 3.0 |
| CCC (0.8 l/ha at T1 & T2) | 8 | 8 | 10 | 3.5 |
| CCC (0.8 l/ha at T1 & T2) + ATS (0.8 l/ha at T1 & T2) | 5 | 5 | 8 | 3.5 |
| CCC (0.8 l/ha at T1 & T2) + KS (20 g/ha at T1 & T2) | 8 | 3 | 13 | 3.3 |
| CCC (0.8 l/ha at T1 & T2) ATS (0.8 l/ha at T1 & T2) + KS (20 g/ha at T1 & T2) | 0 | 3 | 5 | 4.3 |

The following show non-limiting examples of formulated compositions in accordance with the present invention

| FOLIAR FERTILISER ONE INGREDIENTS | Specific Gravity | Kilogram per batch | percentage w/w | Volume per batch | gram/liter of ingredient | gram/liter of active |
|---|---|---|---|---|---|---|
| Water | 1.000 | 150.0000 | 7.50000 | 150.0000 | 96.2564 | 96.2564 |
| Wetting agent | 1.000 | 10.0000 | 0.50000 | 10.0000 | 6.4171 | 6.4171 |
| Salicylic Acid | 1.000 | 10.0000 | 0.50000 | 10.0000 | 6.4171 | 6.4171 |
| Potassium hydroxide (20% w/w) | 1.200 | 130.0000 | 6.50000 | 108.3333 | 83.4222 | 83.4222 |
| Copper EDTA chelate (14.3% Cu w/w) | 1.200 | 30.0000 | 1.50000 | 25.0000 | 19.2513 | 19.2513 |
| Iron EDTA chelate (13.2% Fe w/w) | 1.200 | 30.0000 | 1.50000 | 25.0000 | 19.2513 | 19.2513 |
| Pot phosphites (42% w/w) | 1.342 | 1,000.0000 | 50.00000 | 745.1565 | 641.7092 | 269.5179 |
| Ammonium thiosulphate (60% w/w) | 1.320 | 640.0000 | 32.00000 | 484.8465 | 410.6939 | 246.4183 |
| Totals | | 2,000.0000 | 100.00000 | 1,558.3383 | 1,283.4184 | 746.9495 |
| N | | | 3.84% w/w | | 49 g/liter w/v | |
| P | | | 4.68% w/w | | 60 g/liter w/v | |
| P as $P_2O_5$** | | | 10.64% w/w | | 137 g/liter w/v | |
| K | | | 9.91% w/w | | 125 g/liter w/v | |
| K as $K_2O$ | | | 11.93% w/w | | 150 g/liter w/v | |
| S | | | 8.32% w/w | | 107 g/liter w/v | |
| S as $SO_3$ | | | 20.80% w/w | | 267 g/liter w/v | |

**theoretically

| FOLIAR FERTILISER TWO INGREDIENTS | Specific Gravity | Kilogram per batch | percentage w/w | Volume per batch | gram/liter of ingredient | gram/liter of active |
|---|---|---|---|---|---|---|
| Water | 1.000 | 150.0000 | 7.50000 | 150.0000 | 96.2564 | 96.2564 |
| Wetting agent | 1.000 | 10.0000 | 0.50000 | 10.0000 | 6.4171 | 6.4171 |
| Zinc EDTA chelate (15.7% Zn w/w) | 1.000 | 30.0000 | 1.50000 | 30.0000 | 19.2513 | 19.2513 |
| Copper EDTA chelate (14.3% Cu w/w) | 1.000 | 30.0000 | 1.50000 | 30.0000 | 19.2513 | 19.2513 |
| Iron EDTA chelate (13.2% Fe w/w) | 1.000 | 30.0000 | 1.50000 | 30.0000 | 19.2513 | 19.2513 |
| Pot phosphites (42% w/w) | 1.342 | 750.0000 | 37.60000 | 558.8674 | 481.2819 | 202.1384 |
| Ammonium thiosulphate (60% w/w) | 1.320 | 1,000.0000 | 50.00000 | 757.5758 | 641.7092 | 385.0255 |
| Totals |  | 2,000.0000 | 100.00000 | 1,566.4431 | 1,283.4184 | 746.6912 |
|  |  | N | 6.00% w/w | 77 g/liter w/v |  |  |
|  |  | P | 3.51% w/w | 45 g/liter w/v |  |  |
|  |  | P as $P_2O_5$** | 7.98% w/w | 102 g/liter w/v |  |  |
|  |  | K | 6.96% w/w | 88 g/liter w/v |  |  |
|  |  | K as $K_2O$ | 8.39% w/w | 105 g/liter w/v |  |  |
|  |  | S | 13.00% w/w | 167 g/liter w/v |  |  |
|  |  | S as $SO_3$ | 32.50% w/w | 417 g/liter w/v |  |  |
|  |  | **theoretically |  |  |  |  |

The above Examples show that the compositions of the present invention show the desired fertilisation and antifungal effects.

What is claimed is:

1. A fertiliser composition comprising at least one phosphonate and at least one thiosulphate.

2. A fertiliser composition according to claim 1 wherein the phosphonate is ammonium, sodium or potassium phosphonate or a mixture thereof.

3. A fertiliser composition according to claim 1 wherein the thiosulphate is ammonium, sodium or potassium thiosulphate or a mixture thereof.

4. A fertiliser composition according to claim 1 in the form of a concentrate.

5. A fertiliser composition according to claim 1 in the form of an aqueous solution.

6. A fertiliser composition according to claim 5 comprising 150 g/l phosphonate, 275 g/l thiosulphate and/or 10 g/l salicylamide.

7. A fertiliser composition according to claim 6 wherein the phosphonate comprises 75 g/l mono-potassium phosphonate and 75 g/l di-potassium phosphonate.

8. A fertiliser composition according to claim 1 further comprising at least one salicylic acid, homologue, derivative, or salt thereof.

9. A fertiliser composition according to claim 8 wherein the derivative of salicylic acid is salicylamide or a salt thereof.

10. A fertiliser composition according to claim 8 wherein the homologue of salicylic acid is benzoic acid or a salt or derivative thereof.

11. A fertiliser composition according to claim 8 wherein the salt of salicylic acid, its homologue or derivative is an organic or inorganic salt.

12. A fertiliser composition according to claim 11 wherein the salt is a sodium or potassium salt or mixtures thereof.

13. A fertiliser composition according to claim 8 further comprising a plant growth regulator.

14. A fertiliser composition according to claim 13 wherein the plant growth regulator is chlormequat.

15. A fertiliser composition according to claim 1 further comprising a plant growth regulator.

16. A fertiliser composition according to claim 15 wherein the plant growth regulator is chlormequat.

17. A method of stimulating the growth of a plant comprising applying an effective amount of the fertiliser composition of claim 1 to the plant or its environs to stimulate the growth of the plant.

18. A method of controlling parasitic fungi comprising applying the fertiliser composition of claim 1 to the parasitic fungi.

19. A method for fertilising a plant comprising applying a fertiliser composition according to claim 1 to the plant or its environs.

20. A method according to claim 19 wherein the phosphonate is applied at 150 g/ha to 2 kg/ha.

21. A method according to claim 19 wherein the thiosulphate is applied at 250 g/ha to 6 kg/ha.

22. A method according to claim 19 wherein at least one salicylic acid, a homologue, derivative, or salt thereof is applied at 1 g/ha to 100 g/ha.

23. A fertiliser composition comprising at least one phosphonate and at least one salicylic acid, homologue, derivative, or salt thereof.

24. A fertiliser composition according to claim 23 wherein the phosphonate is ammonium, sodium or potassium phosphonate or a mixture thereof.

25. A fertiliser composition according to claim 23 wherein the derivative of salicylic acid Is salicylamide or a salt thereof.

26. A fertiliser composition according to claim 23 wherein the homologue of salicylic acid is benzoic acid or a salt or derivative thereof.

27. A fertiliser composition according to claim 23 wherein the salt of salicylic acid, its homologue or derivative is an organic or inorganic salt.

28. A fertiliser composition according to claim 23 in the form of a concentrate.

29. A fertiliser composition according to claim 23 in the form of an aqueous solution.

30. A fertiliser composition according to claim 23 further comprising a plant growth regulator.

31. A fertiliser composition according to claim 30 wherein the plant growth regulator is chlormequat.

32. A method for fertilising a plant comprising applying a fertiliser composition according to claim 23 to the plant or its environs.

33. A method according to claim 32 wherein at least one salicylic acid, a homologue, derivative, or salt thereof is applied at 1 g/ha to 100 g/ha.

34. A fertiliser composition comprising at least one thiosulphate and at least one salicylic acid, homologue, derivative, or salt thereof.

35. A fertiliser composition according to claim 34 wherein the thiosulphate is ammonium, sodium or potassium thiosulphate or a mixture thereof.

36. A fertiliser composition according to claim 34 wherein the derivative of salicylic acid is salicylamide or a salt thereof.

37. A fertiliser composition according to claim 34 wherein the homologue of salicylic acid is benzoic acid or a salt or derivative thereof.

38. A fertiliser composition according to claim 34 wherein the salt of salicylic acid, its homologue or derivative Is an organic or inorganic salt.

39. A fertiliser composition according to claim 34 in the form of a concentrate.

40. A fertiliser composition according to claim 34 in the form of an aqueous solution.

41. A fertiliser composition according to claim 34 further comprising a plant growth regulator.

42. A method for fertilising a plant comprising applying a fertiliser composition according to claim 34 to the plant or its environs.

43. A method according to claim 42 wherein the thiosulphate is applied at 250 g/he to 6 kg/ha.

44. A method according to claim 42 wherein at least one salicylic acid, a homologue, derivative, or salt thereof is applied at 1 g/ha to 100 g/ha.

45. A fertiliser composition according to claim 41 wherein the plant growth regulator is chlormequat.

* * * * *